United States Patent

[11] 3,599,698

[72] Inventors Michael J. Skehan
 Fairlawn Village;
 Gerhart L. Gerbeth, Akron; Gilbert J. Bozzelli, Cuyahoga Falls; Paul E. Milliken, Massillon, all of, Ohio
[21] Appl. No. 855,997
[22] Filed Sept. 8, 1969
[45] Patented Aug. 17, 1971
[73] Assignee The Goodyear Tire & Rubber Company
 Akron, Ohio

[54] RIM
 9 Claims, 5 Drawing Figs.
[52] U.S. Cl. ..................................................... 152/410
[51] Int. Cl. ..................................................... B60c 5/16
[50] Field of Search .......................................... 152/401, 405—410

[56] References Cited
 UNITED STATES PATENTS
1,689,273 10/1928 Zipper et al. .................. 152/410
3,003,538 10/1961 Gerbeth ........................ 152/405
3,529,869 9/1970 Casey ........................... 152/409
Primary Examiner—Arthur L. La Point
Assistant Examiner—Richard A. Bertsch
Attorneys—F. W. Brunner and Paul E. Milliken ABSTRACT: A multipiece rim for use on off-the-road type vehicles such as earthmovers and the like, particularly those vehicles using low-pressure tires. A thrust plate is bolted to a bracket on the bead seat band of the rim and extends over the axially outer edge of the rim base to prevent axially inward movement of the bead seat band which may break the seal between the bead seat band and the rim base and permit loss of air from a tire carried on the rim. In addition to engaging the rim base to prevent axial movement, the thrust plate may also engage one or more lugs on the rim base to prevent circumferential movement of the bead seat band with respect to the rim base.

INVENTORS
MICHAEL J. SKEHAN
GERHART L. GERBETH
GILBERT J. BOZZELLI
PAUL E. MILLIKEN
ATTORNEY

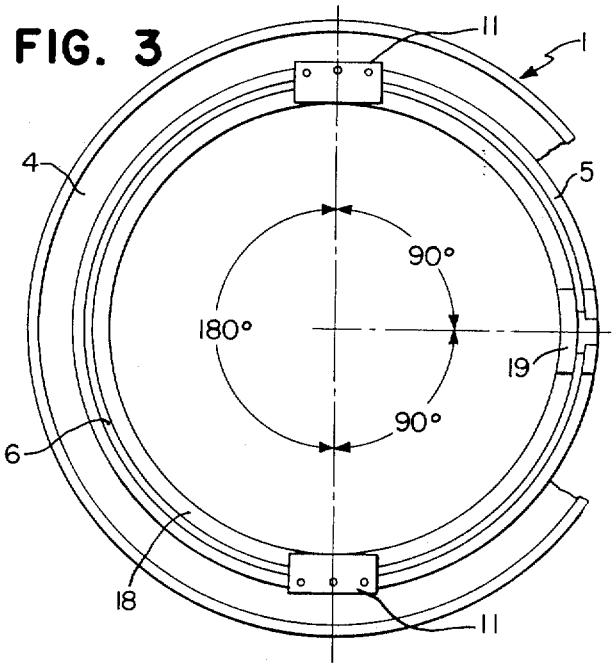
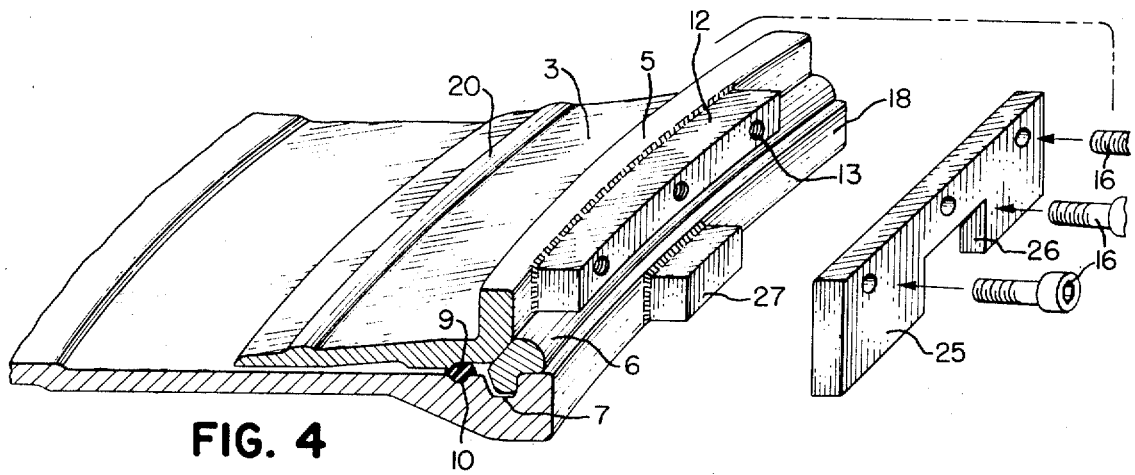
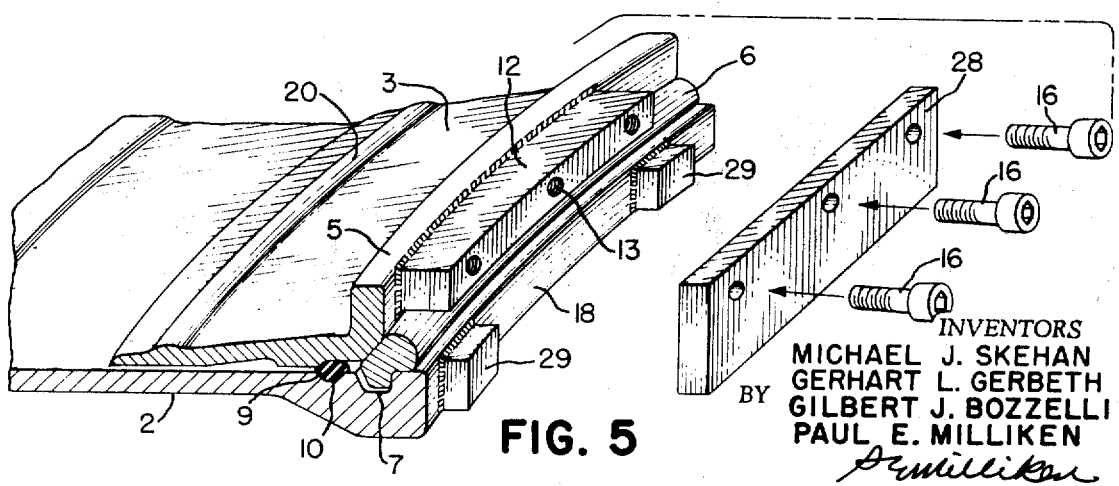
INVENTORS
MICHAEL J. SKEHAN
GERHART L. GERBETH
GILBERT J. BOZZELLI
PAUL E. MILLIKEN
ATTORNEY

RIM

This invention relates to a multipiece wheel rim for use on earthmovers and other off-the-road vehicles and, in particular, to those vehicles using low-pressure tires.

BACKGROUND OF THE INVENTION

This invention is designed for use on multipiece wheel rims of the type shown in U.S. Pat. No. 3,003,538 issued to G. L. Gerbeth. The above-mentioned Gerbeth patent claims a driver assembly which is mounted on a multipiece wheel rim for the purpose of preventing circumferential movement of the bead seat band on the rim base. While the device claimed in the Gerbeth patent performs its function quite satisfactorily, another problem has arisen due to the increasing use in recent years of lower pressure tires. When a vehicle such as an earthmover or other such off-the-road equipment is operating on a steep bank or incline, there is a tendency for the weight of the vehicle to cause axial pressure against the tires, thereby tending to urge the tires to move in an axial direction on the wheel rim. In a rim structure of the type shown in the above-mentioned Gerbeth patent, if sufficient axial pressure is exerted on the tire, there is a tendency for the tire and the bead seat band to shift axially inwardly and break the seal between the bead seat band and the rim base. When this occurs, air pressure is lost from the tire and the tire goes flat. To prevent such occurrence, it was necessary to provide some type of retaining means to prevent the axial movement of the bead seat band on the rim base.

OBJECTS OF THE INVENTION

It is a primary object of this invention to overcome the problem of axial movement of the bead seat band on the rim base which results in loss of air from a tire carried on the rim. Another object of this invention is to provide a rim structure which will not only prevent axial movement of the bead seat band with respect to the rim base, but will also prevent circumferential movement of the bead seat band with respect to the rim base. These and other objects of the invention will become more fully apparent as the description proceeds in the following specification and the accompanying drawings.

BRIEF DESCRIPTION OF THE DRAWINGS

FIG. 3 is a simplified side view of a wheel rim showing the location of the retaining means of the invention upon the rim;

FIG. 4 is an exploded view showing another embodiment of the invention in which the retaining means prevents both axial and circumferential movement of the bead seat band on the rim base; and FIG. 5 is a perspective view similar to that shown in FIG. 4 but showing a slightly different modification of the invention.

DESCRIPTION OF THE PREFERRED EMBODIMENTS

Figure 1:
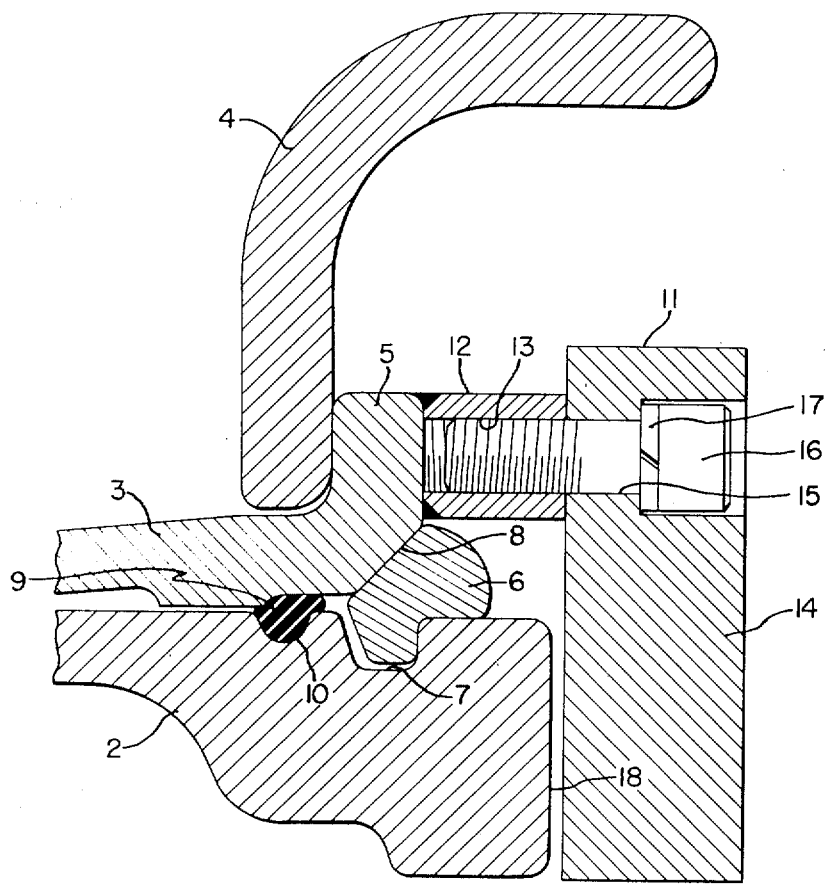
FIG. 1 is a cross-sectional view taken on line 1-1 of FIG. 2 showing one embodiment of the invention.
Figure 2:
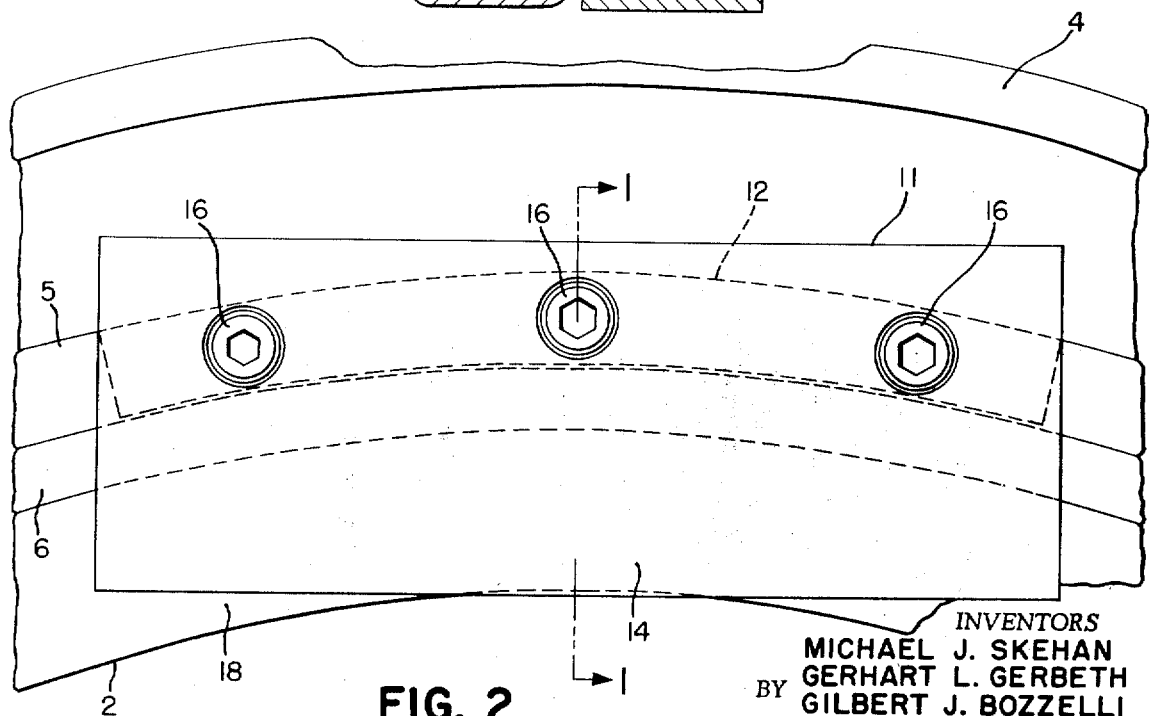
FIG. 2 is a fragmentary side view of a wheel rim showing one embodiment of the invention mounted thereon.

Referring now to FIGS. 1 and 2, the wheel rim assembly is indicated generally by the numeral 1. The assembly 1 has an annular endless rim base 2 which carries an annular endless bead seat band 3. Since the overall structure of the wheel rim in this application is substantially identical to that shown in U.S. Pat. No. 3,003,538 issued to G. L. Gerbeth, the rim assembly will not be illustrated or described herein in any great detail. In the interest of clarity, however, it should be pointed out that the bead seat band 3 is carried only on one side of the rim. The opposite side of the rim has a side ring carried directly on the rim base. In FIGS. 1 and 2, an annular side ring 4 is carried on the beat seat band 3 axially inwardly from a radially outwardly extending flange 5. The bead seat band 3 is retained on the rim base 2 by a split lockring 6 which engages an annular gutter 7 and bears against a beveled surface 8 on the axially outer edge of the bead seat band 3. A resilient seal ring 9 made of rubber or other suitable material is carried in an annular groove 10 and creates a seal between the rim base 2 and the bead seat band 3 thereby retaining air in a tire (not shown) carried on the rim assembly 1. It may be seen from looking at FIG. 1 that if the bead seat band 3 moves axially to the left with respect to the rim base 2, the seal created by the seal ring 9 will be broken and the air will escape from the tire. To prevent such axial movement of the rim base 3, a retaining assembly 11 is attached thereto. The assembly 11 is made up of a bracket 12 having threaded holes 13 therein fastened to the axially outer edge of the flange 5, preferably by welding. Although three welded holes 13 are shown in the present embodiment, it is obvious that any number of holes may be used depending upon the size of the retaining assembly 11. A thrust plate 14 having holes 15 therethrough is fastened to the bracket 12 by a plurality of bolts 16 which pass through the holes 15 and engage the threaded holes 13 of the bracket 12. A washer 17 may be used with each bolt 16 if desired. When bolted to the bracket 12, the thrust plast 14 extends radially inwardly over the axially outer end 18 of the rim base 2. The thrust plate 14, as shown in FIG. 2, is of rectangular shape; however, it will be understood that it may be shaped in a curved configuration if desired to conform to the contour of the wheel rim and the ends may be radially tapered. When the thrust plate 14 is bolted to the bracket 12 after the rim assembly is in assembled position with an inflated tire thereon, the thrust plate 14 should either contact the axially outer edge 18 of the rim base 2 or at least be in close proximity thereto so that only slight, if any, axial movement of the bead seat band 3 is permitted. To show how the retaining assembly 11 is normally circumferentially positioned on a typical rim assembly, we refer now to FIG. 3 which shows the use of two retaining assemblies 11 located 180° apart around the circumference of a wheel rim assembly 1. A driver assembly 19 is located 90° from each of the retaining assemblies 11.

As will be described in FIGS. 4 and 5 of this application, the retaining assembly 11 may sometimes also serve as the driver assembly when properly designed and in such cases, a separate driver 19 may be eliminated with the retaining assembly 11 serving both functions.

Referring now to FIG. 4, the parts of which will be identified by the same numerals as those used in FIG. 1 for the sake of simplicity, a bracket 12 identical to the bracket 12 in FIG. 1 is welded to the bead seat band 3 on the axial outer edge of the flange 5. A thrust plate 25 is similar to the thrust plate 14 except that it has a centrally located slot 26 for engaging a lug 27 which is attached to the axially outer edge 18 of the rim base 2. It may be seen that when the thrust plate 25 is bolted to the bracket 12 by bolts 16 and the bead seat band 3 is properly aligned circumferentially with regard to the rim base 2, the slot 26 will receive the lug 27 therein and the thrust plate 25 will prevent axial movement of the bead seat band 3 by engaging the outer edge 18 of the rim base and will prevent circumferential movement of the bead seat band 3 by engaging the lug 27 in the slot 25. A hump 20 on the radially outer surface of the band 3 prevents axially inward movement of the tire off the bead seat. A similar hump is normally also used adjacent the rim base bead seat (not shown).

FIG. 5 illustrates a modification of the assembly shown in FIG. 4 wherein a solid thrust plate 28 is bolted to the bracket 12 by the bolts 16 and is engaged on each end by a pair of driver lugs 29. The ends of the thrust plate 28 may be parallel as shown or may be tapered radially inwardly to provide better alignment with the lugs 29. While either the configuration as shown in FIGS. 4 and 5 may be used, the configuration of FIG. 4 is preferable because of its simplicity. When the embodiment of the invention shown in FIGS. 4 or 5 is used, the driver lug assembly 19 of the type claimed in U.S. Pat. No. 3,003,438 is no longer needed and may be omitted from the rim assembly. Normally, when two of the retaining assemblies 11 are used, only one of the assemblies need use the configuration shown in FIG. 4 and the other may use the configuration shown in FIG. 1 without the slotted thrust plate and without the driver lug 27 as shown in FIG. 4. The reason for using only one driver lug is that it is easier for alignment purposes than when two driver lugs are used at 180° circumferential spacing from each other.

Although as illustrated herein, it is normally contemplated the two retaining assemblies be used at 180° around the circumference of the rim from each other, it should be understood that other circumferential spacing may be used and more than two such retaining assemblies may be used and more than two such retaining assemblies may be used on each rim. It may also be understood that the thrust plate may be an annular ring which extends completely around the circumference of the rim. These and various other obvious modifications may be made without departing from the scope of the invention. It is obvious that other means of fastening the thrust plate to the bracket on the bead seat band may be utilized.

What we claim is:

1. A multiple-piece rim for mounting a tire thereon including a generally cylindrical endless rim base, a removable endless bead seat band encircling said rim base, a transversely split locking ring engaging said base and said bead seat band to maintain the rim base and bead seat band in the assembled position when a tire is mounted on said rim and retaining means to prevent axial inward movement of said bead seat band on said rim base when the tire and rim are in use on a vehicle, said retaining means comprising:
    A. at least one first member extending from the axial outer edge of the bead seat band; and
    B. at least one second member removably attached solely to the first member;
    C. said second member extending over at least a portion of the axial outer edge of the rim base to prevent excessive axial inward movement of the bead seat band on the rim base.

2. A multiple-piece rim as claimed in claim 1 wherein the first member has threaded holes for receiving bolts for attaching the second member thereto.

3. A multiple-piece rim as claimed in claim 1 wherein the first member is welded to the bead seat band.

4. A multiple-piece rim as claimed in claim 1 wherein the second member is a plate with a plurality of openings therein.

5. A multiple-piece rim as claimed in claim 1 wherein two retaining means are used, each said retaining means being located at substantially 180° around the wheel rim from the other retaining means.

6. A multiple-piece rim as claimed in claim 5 wherein each of the retaining means is located substantially 90° around the wheel rim from a driver assembly.

7. A multiple-piece rim as claimed in claim 1 including a third member attached to the axially outer edge of the rim base to contact the second member and prevent relative circumferential movement between the rim base and the bead seat band.

8. A multiple-piece rim as claimed in claim 7 wherein the third member is a lug which engages a slot in the second means.

9. A multiple-piece rim as claimed in claim 7 wherein the third member is a pair of lugs which receive the second means therebetween.